3,454,412
STABILIZED SYNTHETIC POLYAMIDES
Kenneth B. Stokes, Minneapolis, Minn., assignor to General Mills, Inc., a corporation of Delaware
No Drawing. Filed Oct. 19, 1966, Ser. No. 587,672
Int. Cl. C08g 51/60, 20/00
U.S. Cl. 106—287      11 Claims

ABSTRACT OF THE DISCLOSURE

There is disclosed polyamides stabilized against light, air and heat employing as stabilizers a mixture of (I) hydroxyalkylphenyl benzotriazole or hydroxybenzophenones, and (II) a hydroxy benzylalkyl ether or alkylated bisphenol. The preferred stabilizing compositions are a mixture of 4,4'-thiobis(6-tert-butyl-o-cresol) and 2(2'-hydroxy-3',5'-di-t-butylphenyl)-5-chlorobenzotriazole or a mixture of 3,5-di-tert-butyl-4-hydroxybenzyl ether and 2(2'-hydroxy-3',5'-di-t-butylphenyl) - 5 - chlorobenzotriazole, preferably at a level of about 0.25–0.5% by weight of each. Further improvement is obtained by the addition of calcium carbonate.

---

This invention relates to polyamides stabilized against the action of light, air, and heat, and in particular to stabilized polymeric fat acid polyamides.

It is known that many synthetic polymers when exposed to light, air, and/or heat become degraded in color and mechanical properties. Discoloration and impairment of mechanical properties become more pronounced at exposure to increased temperatures. This is particularly true of the polyamide resins. The effect of known stabilizers is, however, relatively poor and some form colored decomposition or oxidation products.

It has now been found that improved stability can be obtained against the action of heat, air, and/or light for polyamides which contain as stabilizers from 0.05 to about 3% by weight preferably from 0.25 to about 2% by weight of combinations of certain compounds described hereinbelow.

Among the stabilizers useful in the present invention are hydroxyalkylphenylbenzotriazoles wherein the alkyl groups have from 1 to 6 carbon atoms. Illustrative thereof are the compounds 2(2'-hydroxy-3'-t-butyl-5'-methyl phenyl)5-chloro benzotriazole, 2-(2'-hydroxy-5'-methyl phenyl)benzotriazole, and 2-(2'-hydroxy-3',5'-di-t-butyl phenyl)5-chloro benzotriazole. Other illustrative stabilizers are hydroxybenzophenones such as 2,2'-dihydroxy-4,4'-dimethoxybenzophenone and 2,2',4,4'-tetrahydroxybenzophenone. Still other suitable products are hydroxy benzylalkyl ethers, the alkyl group having from 1 to 4 carbon atoms such as 3,5-di-tert-butyl-4-hydroxybenzyl ether; alkylated bisphenols such as 4,4'-thiobis (6-tert-butyl-o-cresol), 2,2'-methylene-bis (4-methyl-6-tert-butyl) phenol, 2,2'-thiobis (4-methyl-6-tert-butyl) phenol, and 2,6-bis (2' - hydroxy-3' - tert - butyl-5'-methyl benzyl)-4-methyl phenol.

The stabilizers set forth above vary in their degree of stabilization. With some, the primary effect is stabilization against heat and/or air. With others, the primary effect is stabilization against light and/or air. For example, 2,6-bis(2' - hydroxy-3'-tert-butyl-5'-methyl benzyl)-4-methyl phenol is primarily an antioxidant while 2(2'-hydroxy-3',5'-di-tert-butyl phenyl)5-chlorobenzotriazole is primarily a light stabilizer (ultraviolet absorber).

Preferably the stabilizers are employed in combinations of antioxidant and ultraviolet absorber, in admixture to provide optimum effect against light, air, and heat. Not only does the mixture thereby provide stabilization against both heat and light but it was also found that the mixture will provide greater stabilization against either heat or light than would the individual compounds alone thereby providing a so-called synergistic effect.

The exact amount of stabilizing compound to be employed and optimum results will depend on the particular compound. In the hexamethylene diamine polyamide of hydrogenated and distilled polymerized tall oil fatty acids, for example, 4,4'-thiobis(6-tert-butyl-o-cresol) provides maximum protection for both light and heat at about 0.5% by weight but may be employed at any level up to about 2.0% for good results. The 2(2'-hydroxy-3',5'-di-t-butyl phenyl)-5-chlorobenzotriazole has a maximum light stabilizing effect at about 1 to 2% but acts somewhat as a sensitizer for thermal degradation with a maximum effect at about 1.25%. When employed by itself, it is preferred that 2(2'-hydroxy-3',5'-di-t-butyl phenyl)-5-chlorobenzotriazole be employed at about 0.3% or less. The 2,2',4,4'-tetrahydroxybenzophenone provides increasing light stability with increasing concentration up to 2.0%. However, this compound shows a strong sensitizing effect for thermal degradation with maximum effect at about 0.25% by weight and is, accordingly, preferably employed at very low (less than 0.25%) or very high (1–2% concentrations when employed alone.

The preferred stabilizing compositions were found to be mixtures of 4,4'-thiobis(6-tert-butyl-o-cresol) and 2(2'-hydroxy-3',5'-di-t-butyl phenyl)5-chlorobenzotriazole and mixtures of 3,5-di-tert-butyl-4-hydroxybenzyl ether and 2(2' - hydroxy-3',5'-di-t-butyl phenyl)5 - chlorobenzotriazole, preferably at a level of 0.25–0.5% by weight of each component of the total mixture. Further improvement in heat stabilization can be obtained with the addition of calcium carbonate at a level of from 0.25 to 1% by weight based on the synthetic polymer.

The invention is applicable to polyamides which are susceptible to light, air, and/or thermal degradation. Accordingly, the invention finds utility with nylon polyamide resins and polymeric fat acid polyamides. The invention is particularly applicable to the polyamide resins, especially the polymeric fat acid polyamides. Illustrative of such polyamide resins are polycondensation or polyaddition products of caprolactams, as well as salts of adipic acid, suberic acid, sebacic acid, and undecanoic acid with hexamethylene diamine and decamethylene diamine.

The relatively high molecular weight polyamides of polymeric fat acids are prepared from substantally equivalent amounts of amine and carboxyl groups. Polyamides of polymeric fat acids having a dimeric fat acid content not less than about 90% by weight and a diamine are of particular interest.

Illustrative of one of such polyamide products are the products described in U.S. Patent 3,249,629 describing polyamides of polymeric fat acids having a dimeric fat acid content above 95% and 1,3 or 1,4-cyclohexane-bis (methylamine). The preparation of polymeric fat acids and one method of analysis for monomeric, dimeric, and trimeric fat acids can be found described in said U.S. Patent 3,249,629.

While said patent relates only to polyamides of 1,3 or 1,4-cyclohexane bis (methylamine), the present invention is applicable to polyamides of polymeric fat acids prepared from diamines in general, said diamines being aliphatic, cycloaliphatic or aromatic diprimary diamines which may be ideally represented by the formula

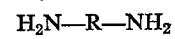

$$H_2N—R—NH_2$$

where R is an aliphatic, cycloaliphatic or aromatic radical preferably having from 2 to about 40 carbon atoms. While R is preferably a hydrocarbon radical, R may contain ether linkages such as in diamines prepared from diphenyl ether sometimes called diphenyl oxide. R may also be saturated or unsaturated, straight or branched chain. Representative of such diamines are the alkylene diamines having from 2 to 20 carbon atoms (preferably 2–6) such as ethylene diamine, 1,2-diamino propane, 1,3-diamino propane, 1,3-diamino butane, tetramethylene diamine, pentamethylene diamine, hexamethylene diamine, decamethylene diamine, and octadecamethylene diamine; metaxylylene diamine, paraxylylene diamine, cyclohexylene diamine, bis($\beta$-aminoethyl)benzene, cyclohexane-bis(methyl amine), diaminodicyclohexylmethane, methylene dianiline, bis(aminoethyl)diphenyl oxide, and dimeric fat diamine. The diamine may be employed alone or mixtures of two or more may be employed. The most preferred diamines are the alkylene diamines in which the alkylene group has from 4–6 carbon atoms and mixtures thereof with dimeric fat diamine (preferably having 36 carbon atoms).

The dimeric fat diamine, sometimes referred to as "dimer diamine," "dimeric fat amine," or "polymeric fat acid diamine" are the diamines prepared by amination of dimeric fat acids. Reference is made thereto in U.S. Patent 3,010,782. As indicated therein, these are prepared by reacting polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —$CH_2NH_2$ groups. Further, this diamine is also described in Research and Development Products Bulletin, CDS 2–63 by General Mills, Inc., June 1, 1963, as "Dimer Diamine" illustrated by the formula $H_2N$—D—$NH_2$ where D is a 36-carbon hydrocarbon radical of a dimeric fat acid.

Copolymerizing compounds may also be employed along with the polymeric fat acids. The copolymerizing compounds commonly employed are aliphatic, cycloaliphatic or aromatic dicarboxylic acids or esters which may be defined ideally by the formulae:

$$R_1OOC—COOR_1$$

and $$R_1OOC—R'—COOR_1$$

where R′ is an aliphatic, cycloaliphatic or aromatic hydrocarbon radical preferably having from 1 to 20 carbon atoms (the most preferred being where R′ is an alkylene radical having from 6–12 carbon atoms) and $R_1$ is hydrogen or an alkyl group (preferably having from 1 to 8 carbon atoms). Illustrative of such acids are oxalic, malonic, adipic, sebacic, suberic, pimelic, azelaic, succinic, glutaric, isophthalic, terephthalic, phthalic acids, benzenediacetic acid, naphthalene dicarboxylic acids and 1,4- or 1,3-cyclohexane dicarboxylic acid.

Essentially molar equivalent amounts of carboxyl and amine groups are employed in preparing the polyamide. Where copolymerizing dicarboxylic acids are employed, it is preferred that the carboxyl groups from the polymeric fat acid should account for at least 50 equivalent percent of the total carboxyl groups employed.

The invention will also find utility with copolymers of polymeric fat acids and the other polyamide resins described such as the nylon type.

The invention can best be illustrated by means of the following examples in which all parts and percentages are by weight unless otherwise indicated.

EVALUATION PROCEDURES (1) Sample preparation.—The additives are incorporated in a Brabender Plasticord at 50 r.p.m., 150° C. oil temperature, allowing 5–10 minutes mixing time. Blended samples are then pressed to film on a Pasadena Hydraulic Press at 350–360° F. with 10,000 to 20,000 lbs. ram pressure. A 15 mil mold is used between Mylar films backed by ferrotypes.

(2) Sample exposure.—Samples are mounted on tetrafluoroethylene impregnated glass cloth (hence easily removed if severely degraded), and exposed as follows: (a) In an Atlas Twin Carbon Arc Weather-Ometer at 115° F. (145° F. black panel), using a water spray cycle of 18 minutes on, 102 minutes off; (b) on the roof of a building in Minneapolis, Minn., facing south at an angle of 45° from the horizontal.

(3) Testing.—Microtensile specimens are die cut from the samples before and after exposure, then tested for tensile properties (ASTM D1708–59T), using an Instron testing instrument. Screening measurements are tested at 2.0 inches/minute cross head speed. These results are re-evaluated (and tested for synergism) at 0.5 inch/minute, complying with standard practice at this laboratory.

Samples are tested upon removal from exposed environment (if possible) and hence, no conditioning time as defined by A.S.T.M. is used, since exposure is considered as conditioning in this case.

"Color chips" were retained and mounted, so color and appearance were subjectively evaluated.

EXAMPLE 1

Illustrative specific preparation of polyamide resin A

Charge: (1) 150 lbs. hydrogenated and distilled dimer acid of polymerized tall oil fatty acids (2 lots $a$ and $b$ 1:1 ratio); (2) 34 lbs. hexamethylene diamine.

Reaction schedule: Load all reactants but the amine into reactor. Degas at 50° C., load the amine and break vacuum with $N_2$. Heat to 200° C. in 2 hours and hold at atmospheric pressure, permitting water to be removed. Heat to 250° C. and hold for one hour, and maintain temperature for additional 2 hours under vacuum. The product is then cooled and recovered.

Analysis of Reactants (1a)

| | |
|---|---|
| AV | 191.9 |
| SV | 197.0 |
| M* (16 hr.) | 1.9 |
| I* (16 hr.) | 2.2 |
| D* (16 hr.) | 94.6 |
| T* (16 hr.) | 1.3 |
| Color (photometric) | 96.8 |
| Eq. wt. | 285 |

(1b)

| | |
|---|---|
| AV | 190.4 |
| SV | 195.3 |
| M* (16 hr.) | 1.8 |
| I* (16 hr.) | 2.2 |
| D* (16 hr.) | 94.8 |
| T* (16 hr.) | 1.1 |
| Color (photometric) | 98.0 |
| Eq. wt. | 287 |

*Gas liquid chromatography.

(2)

| | |
|---|---|
| Eq. wt. | 63.07 |
| Amine no. | 886.5 |

The percent retention of original ultimate tensile strength (percent RUTS) after 470 hours in a twin carbon arc Weather-Ometer was studied with the following results using resin A described.

| Additive | Concentration, percent by weight | RUTS, percent | Appearance Original | Aged |
|---|---|---|---|---|
| X | 0.5 | 41 | VSy | C |
| Y | 0.5 | 54 | C | Sy |
| X+Y | ea. 0.25 | 87 | C | C |
| Control | 0 | 0-15 | C | y |

X=4,4′-thiobis (6-tert-butyl-o-cresol).
Y=2(2′ - hydroxy - 3′,5′ - di -t-butyl phenyl)5 - chlorobenzotriazole.
C=almost colorless.   y=yellow.   S=slight.   V=very.

The effect of the same additives X and Y were studied on percent RUTS as a function of Weather-Ometer exposure time. The results were as follows:

| Exposed time (hours) | Percent RUTS | | | |
|---|---|---|---|---|
| | Control (no additive) | X (0.25%) | Y (0.25%) | X+Y (0.25% each) |
| 0 | 100 | 100 | 100 | 100 |
| 260 | 32 | 62 | 80 | 86 |
| 470 | 12 | 28 | 62 | 90 |
| 490 | 11 | 24 | 60 | 90 |
| 740 | 4 | 14 | 42 | 82 |
| 985 | 1 | 6 | 18 | 65 |

It can be seen from the foregoing that the combination of X+Y appears to provide a synergistic effect in that the percent RUTS at 90 and above exposed time of the combination of X+Y is greater than the sum of the effect of X or Y alone.

At about 1000 Weather-Ometer hours exposure the original color and physical apearance of the stabilized film remains nicely preserved, while the control becomes soft, weak, yellow, pitted and tacky.

EXAMPLE 2

In this example, a polyamide prepared in accordance with Example 1 from hydrogenated and distilled polymerized tall oil fatty acids and hexamethylene diamine was evaluated with a mixture of X and Y.

Illustrative specific preparation of sebacic acid copolyamide B

Charge: (1) 77.5 lbs. hydrogenated and distilled dimer acid of polymerized tall oil fatty acid; (2) 57.25 lbs. sebacic acid; (3) 61.75 lbs. hexamethylene diamine.

Reaction schedule: Load all reactants but the amine into reactor. Degas and load the amine. Break vacuum with $N_2$. Heat to 200° C. and vent. Heat to 275° C. Hold for 1 hour, and hold for additional 3 hours under vacuum. The product is then cooled and removed.

Analysis of Reactants (1)

| | |
|---|---|
| AV | 191.9 |
| SV | 196.5 |
| M* | 0.8 |
| I* | 3.0 |
| D* | 95.5 |
| T* | 0.7 |
| Photometric color, percent | 96 |
| Eq. wt. | 285 |

*Gas liquid chromatography.

(2)

| | |
|---|---|
| AV | 547.9 |
| Eq. wt. | 102.2 |

(3)

| | |
|---|---|
| Eq. wt. | 72.25 |

The percent retention of original elongation [percent R (percent E)] after 275 twin carbon arc Weather-Ometer hours exposure was studied with resin B, the results of which were as follows:

| Additive | Concentration, percent by weight | Percent R (Percent E) | Appearance | |
|---|---|---|---|---|
| | | | Original | Aged |
| X | 0.5 | 20 | Sy | C |
| Y | 0.5 | 0 | Sy | C |
| Control | 0 | 0 | C | C |

The effect of X and/or Y on percent R (percent E) of resin B as a function of time in carbon arc Weather-Ometer exposure time was studied, with the following results:

| Exposed time (hours) | Percent R (percent E) | | | |
|---|---|---|---|---|
| | Control (no additive) | X (0.25%) | Y (0.25%) | X+Y (0.25% ea.) |
| 0 | 100 | 100 | 100 | 100 |
| 125 | 0 | 41 | 2 | 107 |
| 200 | 0 | 42 | 2 | 87 |
| 275 | 0 | 9 | 1 | 31 |

EXAMPLE 3

In the same manner as Example 1, the study of percent RUTS on resin A was conducted, using additives Y and Z (3,5-di-tert-butyl-4-hydroxybenzyl ether) with the following results:

| Additive | Concentration, percent | RUTS, percent | Appearance | |
|---|---|---|---|---|
| | | | Original | Aged |
| Z | 0.5 | 44 | C | Sy |
| Y | 0.5 | 54 | C | VSy |
| Z+Y | ea. 0.25 | 111 | Sy | C |
| Control | 0 | nearly 0 | C | Sy |

| Exposed time (hours) | Control (no additive) | Z (0.25%) | Y (0.25%) | Z+Y (0.25% ea.) |
|---|---|---|---|---|
| 0 | 100 | 100 | 100 | 100 |
| 260 | 32 | 77 | | |
| 470 | 12 | 24 | 66 | 92 |
| 505 | ¹11 | 17 | 61 | 90 |
| 815 | ²4 | 5 | 9 | 69 |
| 1200 | ³1 | 4 | 7 | 32 |

¹ 490 hours. ² 740 hours. ³ 970 hours.

Again there is an appearance of a synergistic effect using additives Z and Y.

EXAMPLE 4

Other stabilizers were also evaluated with resin A prepared from substantially equivalent amounts of hydrogenated and distilled polymerized tall oil fatty acids and hexamethylene diamine as in Example 1.

The results of the evaluation were as follows:

INDIVIDUAL COMPONENTS

| Additive, 0.25% | After 702 Weather-Ometer hours, percent retention of— | | |
|---|---|---|---|
| | Yield strength (Y.S.) | Ultimate tensile strength (U.T.S.) | Percent elongation (E) |
| X | | 12 | 43 |
| M | | 7 | 48 |
| N | | 11 | 35 |
| O | 43 | 23 | 79 |
| P | 51 | 28 | 84 |
| Y | 64 | 35 | 81 |
| Z | | 5 | 62 |
| Q | 91 | 52 | 88 |
| R | 43 | 23 | 63 |
| None (control) | 0 | 11 | *77 |

*492 hours.
M = 2, 2'-methylene-bis(4-methyl-6-tert-butyl)phenol.
N = 2, 2'-thiobis(4-methyl-6-tert-butyl)phenol.
O = 2-(2'-hydroxy-5'-methylphenyl)benzotriazole.
P = 2(2'-hydroxy-3'-t-butyl-5'-methylphenyl)5-chlorobenzotriazole.
Q = 2, 2', 4, 4'-tetrahydroxybenzophenone.
R = 2, 2'-dihydroxy-4, 4'-dimethoxybenzophenone.

Combinations of the additives were evaluated for stabilization. The results were as follows:

| Additives (0.25% ea.) | 703 hours, percent retention of— | | | 1220 hours, percent retention of— | | |
|---|---|---|---|---|---|---|
| | Y.S. | U.T.S. | Percent E | Y.S. | U.T.S. | Percent E |
| M+P | 84 | 61 *(26) | 89 | 85 | 53 | 82 |
| M+Y | 81 | 53 *(11) | 87 | 45 | 10 | 33 |
| N+O | 87 | 53 *(19) | 84 | | 10 | 36 |
| N+Y | 92 | 64 *(17) | 89 | 41 | 45 | 81 |
| N+P | 90 | 64 *(25) | 95 | 90 | 45 | 77 |
| X+P | 95 | 78 *(38) | 102 | 94 | 56 | 89 |
| Z+P | 95 | 70 *(37) | 96 | 91 | 57 | 89 |
| X+Q | 91 | 77 *(13) | 103 | 87 | 60 | 92 |
| X+Q | 93 | 65 *(30) | 95 | 50 | 20 | 10 |
| M+R | 79 | 53 *(23) | 91 | 33 | 15 | 38 |
| N+R | 86 | 58 *(24) | 88 | 77 | 29 | 49 |
| Z+R | 105 | 74 *(46) | 93 | Too weak to test | | |
| X+Q | 86 | 66 | 92 | 83 | 55 *(20) | 94 |
| Z+Q | 96 | 63 | 92 | 68 | 52 *(17) | 95 |

*Percent retention of ultimate tensile strength, over and above the sum of the individual components taken separately. This is a measure of the degree of synergism demonstrated.

EXAMPLE 5

The combination of additives X and Y was evaluated with other polyamide resins of polymeric fat acids on extruded 15 mil films exposed in the carbon arc Weather-Ometer. The resins were prepared as in Example 1.

The polymeric fat acids employed in preparing each of the polyamide resins were polymerized tall oil fatty acids (hydrogenated and distilled) having the following analysis.

Percent:
| | |
|---|---|
| M [1] | 1.3 |
| I [1] | 4.3 |
| D [1] | 93.5 |
| T [1] | 1.0 |
| Acid value | 193 |
| Saponification value | 197 |
| Iodine value | 8.95 |
| Photometric color (percent) | 97.3 |

[1] Gas-liquid chromatography.

The reactants, amounts and analysis of the polyamide resins were as follows:

| | Amounts of reactants in polyamide | | | | |
|---|---|---|---|---|---|
| | C | D | E | F | G |
| Reactants, lbs.: | | | | | |
| Polymeric fat acids | 90 | 77.8 | 116.4 | 120 | 86.3 |
| Sebacic acid | 24.6 | 34.2 | | | 20.2 |
| Hexamethylene diamine | 46.1 | 50.2 | | | |
| Bis(amino ethyl)benzene | | | 33.5 | | |
| Diamino dicyclohexyl methane | | | | 44.0 | 52.6 |
| Polyamide analysis: | | | | | |
| Milliequivalents acid/kg | 13.8 | 24.7 | 16.25 | 21.5 | 33.9 |
| Milliequivalents amine/kg | 16.5 | 11.6 | 6.17 | 8.0 | 8.5 |
| Brabender viscosity (200° C.) | 365 | 540 | [1] 590 | 480 | 250 |

[1] 150° C.

The results of evaluation of the polyamides using a mixture of additives X and Y (0.25% of each) were as follows in which the resins to which X and Y were added are designated with (S) while the undesignated are resin controls having no additives.

| | Percent retention | | | |
|---|---|---|---|---|
| Polyamide | Y.S. | U.T.S. | Percent E | Hours exposed |
| C | | | [2] 0 | 281 |
| C (S) | 120 | 95 | 93 | 281 |
| D [1] | | | 7 | 225 |
| D (S) [1] | 101 | 73 | 55 | 344 |
| E | | | [2] 0 | 235 |
| E (S) | 117 | 87 | 92 | 235 |
| F | | | [2] 0 | 281 |
| F (S) | 90 | 66 | 56 | 281 |
| G | | | [2] 0 | 281 |
| G (S) | 120 | 91 | 78 | 281 |

[1] Additives incorporated in the Brabender Plasticord. Specimens from compression molded sheet.
[2] Specimens were so badly degraded that they disintegrated in the hands while being prepared for tensile tests.

EXAMPLE 6

The data in the foregoing examples were based on Weather-Ometer studies. As previously indicated, outdoor exposure tests were also employed. The following represents data on outdoor exposure tests for about one year on resin A of Example 1.

| | Percent Retention [1] | | |
|---|---|---|---|
| Additives (0.25% each) | Y.S. | U.T.S. | Percent E |
| X | 46 | 14 | 42 |
| Y | 120 | 72 | 90 |
| X+Y | 132 | 78 | 80 |
| Exposed control | | 13 | 30 |
| Original control | [2] 1,291 | [2] 3,542 | 578 |

[1] Percent retention tensile property = $\frac{\text{Aged value}}{\text{Original value}} \times 100$
[2] P.s.i.

EXAMPLE 7

As earlier described, calcium carbonate added along with the stabilizers can further improve stability to thermal degradation. To illustrate this improvement, 0.5% calcium carbonate was added to resin B of Example 2 along with 0.25% each of additive X and Y. For comparison, there was also evaluated a control (no additive), 0.5% calcium carbonate alone and 0.25% each of Y and X additive mixture. The film samples were placed on tetrafluoroethylene impregnated glass cloth and exposed in a convection oven at 150±1° C.

The results were as follows showing percent retention of percent elongation versus time.

| | Percent retention of percent elongation | | | |
|---|---|---|---|---|
| Time (days) | Control (no additive) | Resin B+0.5% CaCO$_3$ | Resin B+0.25% each of X and Y | Resin+0.5% CaCO$_3$+0.25% each of X and Y |
| 0 | 100 | 100 | 100 | 100 |
| 0.3 | 66 | 34 | 62 | 74 |
| 0.95 | 39 | 66 | 68 | 79 |
| 2 | 32 | 6 | 32 | 71 |
| 2.95 | 17 | 0 | 14 | 69 |
| 7 | | | | 19 |

EXAMPLE 8

Additives X and Y and calcium carbonate were also evaluated with nylon 6, 10 (Zytel 31). Both light and heat resistance were tested with results as follows:

| | | Percent elongation after— | | |
|---|---|---|---|---|
| Additive (0.25% each) | Original elongation | 155 Weather-Ometer hours | 24-150° C. oven hours | 48-150° C. oven hours |
| None | 264 | 0 | 0 | 0 |
| X | | 116 | 44 | 35 |
| Y | | 66 | 12 | 0 |
| CaCO$_3$ | | 0 | 0 | 0 |
| X+Y | | 223 *(41) | 98 *(42) | 67 *(32) |
| X+Y+CaCO$_3$ | | 232 *(50) | 160 *(104) | 47 *(12) |

*Percent elongation over and above that expected by adding the results of the individual components taken separately.

The embodiments of the present invention in which an exclusive property or privilege is claimed are defined as follows:

1. A polyamide containing a mixture of (I) a compound selected from the group consisting of (a) 2(2'-hydroxy-3'-t-butyl-5'-methyl phenyl)5 - chlorobenzotriazole, (b) 2-(2'-hydroxy-5'-methyl phenyl)benzotriazole, (c) 2(2'-hydroxy-3',5'-di-t-butyl phenyl)5 - chloro benzotriazole, (d) 2,2' - dihydroxy - 4,4'-dimethoxybenzophenone and (e) 2,2',4,4'-tetrahydroxybenzophenone, and (II) a compound selected from the group consisting of (a) 3,5-di-tert-butyl-4-hydroxybenzyl ether, (b) 4,4'-thiobis (6-tert-butyl-o-cresol), (c) 2,2'-methylene-bis (4-methyl-6-tert-butyl) phenol, (d) 2,2'-thiobis (4-methyl-6-tert-butyl) phenol, and (e) 2,6-bis(2'-hydroxy-3'-tert-butyl-5'-methyl benzyl)-4-methyl phenol.

2. A polyamide as defined in claim 1 in which from 0.05 to about 3% each by weight based on the said polyamide of I and II are employed.

3. A polyamide as defined in claim 1 and further containing from 0.25 to 1% by weight of said polyamide of calcium carbonate.

4. A polyamide as defined in claim 1 wherein said polyamide is a polymeric fat acid polyamide.

5. A polyamide as defined in claim 4 wherein said mixture comprises about 0.25% by weight each of 4,4'-thiobis(6-tert-butyl-o-cresol) and 2(2' - hydroxy-3',5'-di-t-butyl phenyl)5-chlorobenzotriazole.

6. A polyamide as defined in claim 4 wherein said mixture comprises about 0.25% by weight each of 2(2'-hydroxy-3',5'-di-t-butyl phenyl)5-chlorobenzotriazole and 3,5-di-tert-butyl-4-hydroxybenzyl ether.

7. A polyamide as defined in claim 4 wherein said mixture comprises about 0.25% by weight each of 4,4'-thiobis(6-tert-butyl-o-cresol) and 2(2' - hydroxy-3',5'-di-t-butyl phenyl)5-chlorobenzotriazole and further contains about 0.5% of calcium carbonate.

8. A polyamide as defined in claim 4 wherein said polymeric fat acid polyamide resin comprises the amidification product of substantially equivalent amounts of polymerized tall oil fatty acids having a dimeric fat acid content not less than about 90% by weight and a diprimary diamine.

9. A polyamide as defined in claim 8 in which said diprimary diamine is hexamethylene diamine.

10. A polyamide as defined in claim 8 in which said diprimary diamine is bis(amino ethyl) benzene.

11. A polyamide as defined in claim 8 in which said diprimary diamine is diamino dicyclohexyl methane.

References Cited

UNITED STATES PATENTS

| 3,368,997 | 2/1968 | Gordon | 260—45.8 |
| 3,337,356 | 8/7967 | Carboni | 260—45.8 |
| 3,230,194 | 1/1966 | Boyle | 260—45.8 |
| 3,218,332 | 11/1965 | Heller et al. | 260—45.8 |
| 3,113,880 | 12/1963 | Hoeschele et al. | 260—45.95 X |
| 3,086,960 | 4/1963 | Bletso | 260—45.95 |
| 3,066,034 | 11/1962 | Temin | 260—45.8 X |
| 2,913,433 | 11/1959 | Wittbecker | 260—45.95 X |

FOREIGN PATENTS 694,410   9/1964   Canada.

DONALD E. CZAJA, *Primary Examiner.*

C. WARREN IVY, *Assistant Examiner.*

U.S. Cl. X.R.

260—18, 37, 45.8, 45.95, 78